Nov. 17, 1942.　　　　S. COBB　　　　2,302,601

MINIATURE GLASS SHELTER FOR PLANTS

Filed Oct. 23, 1940

INVENTOR
Stanley Cobb
BY
ATTORNEY

Patented Nov. 17, 1942

2,302,601

UNITED STATES PATENT OFFICE 2,302,601

MINIATURE GLASS SHELTER FOR PLANTS

Stanley Cobb, Scarsdale, N. Y.

Application October 23, 1940, Serial No. 362,330

3 Claims. (Cl. 47—29)

This invention relates to new and useful improvements in a miniature glass shelter for plants.

More specifically the invention proposes the construction of a miniature glass shelter characterized by panes of glass held together by means of lengths of wire in a manner to house small plants being grown from the seed. Heretofore, miniature glass shelters of this type have been constructed, but previous constructions have been defective and expensive to produce, in that they involved the use of grotesquely bent lengths of wire which were expensive to produce. Applicant's construction proposes to eliminate the expense involved in producing such miniature glass shelters by utilizing wires having a minimum of bends, but which will still act to securely hold the panes of glass in their suspended position above the plant being covered.

Still further a modification of the invention proposes the provision of strips of wood hinged together and which are engageable with wires upon the top and bottom edges of the panes of glass in a manner to more fixedly hold the same in fixed relation with each other and to be able to lift some of these strips to allow the passage of air under the shelter when desired.

A further object of this invention is the construction of a miniature glass shelter for plants as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

The miniature glass shelter, according to this invention, includes a top strip 30. This top strip 30 is preferably constructed of wood or other similar material and is provided at its bottom corners with outwardly diverging recesses 30$^a$.

Figure 4:
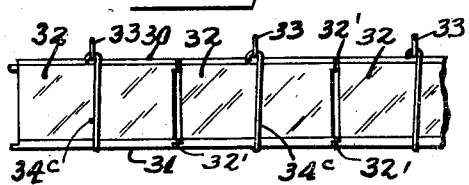
Fig. 4 is side elevational view of a number of glass shelters arranged in end alignment with one another.

The shelter further includes a pair of horizontally spaced bottom strips 31. These strips 31 are also constructed of wood and are provided at their adjacent top corners with upwardly converging recesses 31$^a$. Several of these strips may be joined by hinges 32', as shown in Figure 4 so that certain of the panes 32 may be lifted to allow the passage of air under the shelter when desired.

A member 33 is mounted upon the top strip 30. This member 33 is characterized by a triangular top element 33$^a$ which projects upwards from the top face of the strip 30 which is adapted to be utilized as a handle. The member 33 further comprises a length of wire 33$^b$ which extends downwards through the top strip 30 into the interior of the shelter. This length of wire 33$^b$ is formed at its bottom end with a hook portion 33$^{bb}$.

A means is provided for holding the strips 30 and 31 in position upon the top and bottom edges of the panes of glass 32 in a manner to hold the panes 32 in their diverged condition. This means comprises a wire loop 34 for each of the panes of glass 32. Each of these wire loops 34 is substantially identical in shape and has one end 34$^a$ extended upwards along the inside face of its respective pane of glass. The top end of the end 34$^a$ is bent into a hook 34$^{aa}$ engageable upon the hook 33$^{bb}$ of the downwardly extended length of wire 33$^b$. Each of these wire loops 34 further has its intermediate portion 34$^b$ bent around its respective bottom strip 31. The other end 34$^c$ of the wire loop 34 extends upwards along the outside face of its respective pane of glass 32 and is bent into a hook 34$^{cc}$ engageable upon its respective portion of the triangular part 33$^a$ of the member 33. When the hooks 34$^{aa}$ and 34$^{cc}$ of the wire loops 34 are engaged with their respective portions of the member 33 the elements forming the shelter in this form of the invention will be rigidly connected together and maintained in a fixed position with relation to each other permitting the shelter to be engaged over a growing plant.

Figure 2:
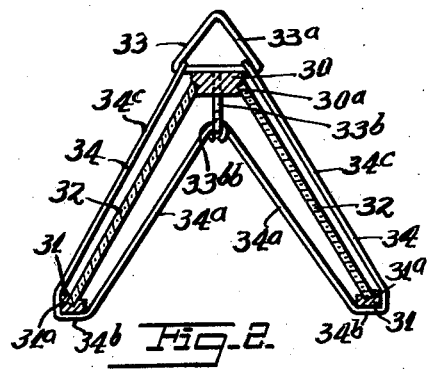
Fig. 2 is a vertical sectional view taken on the line 2—2 of Fig. 1.
Figure 1:
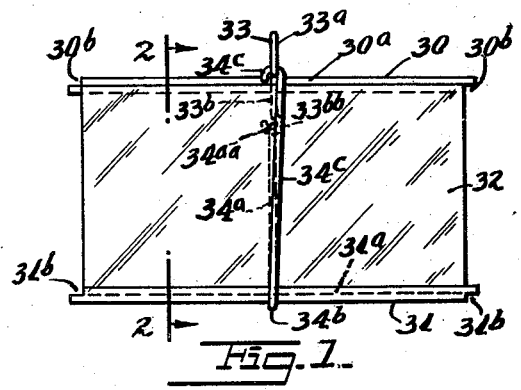
Fig. 1 is a side elevational view of a miniature glass shelter constructed in accordance with this invention.
Figure 3:
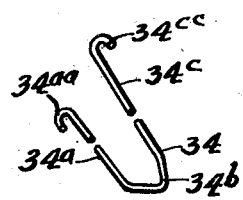
Fig. 3 is a perspective view of one of the holding wires, shown per se.

As shown in Fig. 1 the ends of the strip 30 are provided with oppositely disposed recesses 30$^b$ and the strips 31 are likewise formed with oppositely disposed recesses 31$^b$. These recesses 30$^b$ and 31$^b$ permit the adjacent ends of the strips of like constructed shelters to be engaged with each other when arranged in end alignment for the purpose of permitting the same to be securely bound together in any desired way for holding these shelters securely in end alignment to prevent the passage of cold air therebetween.

It is to be understood that the panes may be made of any suitable transparent material such as glass, plastics, etc., either of transparent colorless material or of any colored substance.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A miniature glass shelter unit for plants, comprising a top strip, a pair of horizontally spaced bottom strips, a pair of diverging panes of glass extending between said top strip and said bottom strips, a member mounted on the center of said top strip, and a wire loop for each of said panes having a central portion extending across the bottom strip and side arms extending upwards along the sides of the panes of glass and having their top ends connected with said member, said member comprising a triangular portion projected upwards from the top face of said top strip, a downwardly extended wire strand projected through said top strip to the interior of said shelter, said wire loop having one of its ends secured to said triangular portion, the other end being secured to said downwardly extending wire strand, and means on each end of said top strip and said bottom strips for rigidly securing said unit with at least a second similar unit.

2. In a miniature glass shelter for plants having a top strip and a pair of diverging panes of glass having their top edges engaging said top strip and held in position by wire loops having their intermediate portions engaging around the bottom edge of said panes of glass and their free ends extended upwards along the faces of said panes of glass and secured to said top strip, a bottom strip for each of said panes of glass disposed between said bottom edges of said panes of glass and said intermediate portions of said wire loops for protecting said bottom edges, and means for elevating one edge of at least one of said panes of glass.

3. In a miniature glass shelter for plants as defined in claim 2, said last said means comprising a hinge for elevating one edge of at least one of said panes of glass.

STANLEY COBB.